(12) United States Patent
Arakawa et al.

(10) Patent No.: US 9,242,466 B2
(45) Date of Patent: Jan. 26, 2016

(54) METHOD FOR MANUFACTURING WATER-REPELLENT FILM, AND SUBSTRATE, NOZZLE PLATE, INK JET HEAD, AND INK JET RECORDING DEVICE

(71) Applicants: FUJIFILM Corporation, Tokyo (JP); Material Design Factory Co., Ltd., Osaka (JP)

(72) Inventors: Takami Arakawa, Ashigarakami-gun (JP); Hiroshi Nakayama, Osaka (JP)

(73) Assignees: FUJIFILM Corporation, Tokyo (JP); Material Design Factory Co., Ltd., Osaka (JP)

( * ) Notice: Subject to any disclaimer, the term of this patent is extended or adjusted under 35 U.S.C. 154(b) by 0 days.

(21) Appl. No.: 14/792,564

(22) Filed: Jul. 6, 2015

(65) Prior Publication Data

US 2015/0306874 A1    Oct. 29, 2015

Related U.S. Application Data

(63) Continuation of application No. PCT/JP2013/083209, filed on Dec. 11, 2013.

(30) Foreign Application Priority Data

Jan. 9, 2013    (JP) .................................. 2013-002064

(51) Int. Cl.
*B41J 2/135* (2006.01)
*B41J 2/14* (2006.01)
(Continued)

(52) U.S. Cl.
CPC ................ *B41J 2/1433* (2013.01); *B41J 2/162* (2013.01); *B41J 2/1642* (2013.01); *C09D 183/04* (2013.01)

(58) Field of Classification Search
CPC ........ B41J 2/1433; B41J 2/162; B41J 2/1642; C09D 183/04
See application file for complete search history.

(56) References Cited

U.S. PATENT DOCUMENTS 8,262,200 B2 *   9/2012   Okamura ............. B41J 2/14233
                                                            347/44
2010/0026760 A1  2/2010   Matsuo

FOREIGN PATENT DOCUMENTS

JP    2006-001215 A    1/2006
JP    2006-189819 A    7/2006
(Continued)

OTHER PUBLICATIONS

International Search Report; PCT/JP2013/083209; Mar. 18, 2014.
(Continued)

*Primary Examiner* — Juanita D Jackson
(74) *Attorney, Agent, or Firm* — Studebaker & Brackett PC

(57) ABSTRACT

The present invention provides a method for manufacturing a water-repellent film, including an adhesion precursor film forming step of forming, on a substrate, an adhesion precursor film mainly of a Si—O bond with hydrogen directly bonded to Si; an irradiating step of irradiating the adhesion precursor film with excitation energy to increase an OH group present on a surface of the adhesion precursor film to thereby change the adhesion precursor film into an adhesion reinforcing film; and an organic film coating step of coating the adhesion reinforcing film with an organic film by using a silane coupling agent, wherein a content of the hydrogen directly bonded to Si in the adhesion precursor film is $1.0 \times 10^{17}$ atoms/cm$^2$ or more in terms of a $H_2$ molecule.

10 Claims, 5 Drawing Sheets

(51) Int. Cl.
*C09D 183/04* (2006.01)
*B41J 2/16* (2006.01)

(56) References Cited

FOREIGN PATENT DOCUMENTS

| | | | |
|---|---|---|---|
| JP | 2008-105231 | A | 5/2008 |
| JP | 2010-030142 | A | 2/2010 |
| JP | 2012-213873 | A | 11/2012 |

OTHER PUBLICATIONS

Written Opinion of the International Searching Authority; PCT/JP2013/083209; Mar. 18, 2014.
Notification of Transmittal of Translation of the International Preliminary Report on Patentability and Translation of the Written Opinion of the International Searching Authority ; PCT/JP2013/083209 issued on Jul. 23, 2015.

* cited by examiner

FIG.7

| | UV IRRADIATION TIME [hours] (OPERATION FOR INCREASING OH GROUP) | AMOUNT OF HYDROGEN GENERATED [atoms/cm²] (AMOUNT OF Si-H BONDS) | AMOUNT OF CH₃ GENERATED [atoms/cm²] (AMOUNT OF CH₃ BONDS) | AMOUNT OF WATER (350°C) GENERATED [atoms/cm²] (AMOUNT OF Si-OH BONDS) |
|---|---|---|---|---|
| EXAMPLE1 | 0 | 2.2×10¹⁷ | 9.9×10¹⁵ | 8.5×10¹³ |
| | 6 | 6.5×10¹⁶ | 1.6×10¹⁶ | 1.0×10¹⁶ |
| | 12 | 5.0×10¹⁶ | 1.8×10¹⁶ | 2.3×10¹⁶ |
| | 30 | 5.1×10¹⁶ | 3.2×10¹⁶ | 1.0×10¹⁷ |
| EXAMPLE2 | 0 | 1.3×10¹⁷ | 3.0×10¹⁶ | 8.5×10¹⁴ |
| | 2 | 5.6×10¹⁶ | 2.1×10¹⁶ | 6.5×10¹⁵ |
| EXAMPLE3 | 0 | 2.4×10¹⁷ | 4.6×10¹⁶ | 6.6×10¹⁴ |
| | 2 | 5.4×10¹⁶ | 2.4×10¹⁶ | 1.0×10¹⁶ |
| | 6 | 2.5×10¹⁶ | 1.3×10¹⁶ | 1.7×10¹⁶ |
| | 12 | 1.9×10¹⁶ | 9.5×10¹⁵ | 2.3×10¹⁶ |
| | 30 | 1.7×10¹⁵ | 2.9×10¹⁴ | 3.4×10¹⁶ |
| COMPARATIVE EXAMPLE1 | 0 | 1.4×10¹⁶ | 9.4×10¹⁵ | 1.5×10¹⁶ |
| | 2 | 8.0×10¹⁵ | 6.9×10¹⁵ | 1.7×10¹⁶ |
| COMPARATIVE EXAMPLE2 | 0 | 3.9×10¹⁵ | 7.0×10¹⁴ | 2.9×10¹⁶ |
| | 2 | 2.3×10¹⁵ | 1.9×10¹⁴ | 1.6×10¹⁶ |

METHOD FOR MANUFACTURING WATER-REPELLENT FILM, AND SUBSTRATE, NOZZLE PLATE, INK JET HEAD, AND INK JET RECORDING DEVICE

CROSS-REFERENCE TO RELATED APPLICATIONS

This application is a Continuation of PCT International Application No. PCT/JP2013/083209 filed on Dec. 11, 2013, which claims priority under 35 U.S.C. §119(a) to Japanese Patent Application No. 2013-002064 filed on Jan. 9, 2013. Each of the above applications is hereby expressly incorporated by reference, in their entirety, into the present application.

BACKGROUND OF THE INVENTION

1. Field of the Invention

The present invention relates to a method for manufacturing a water-repellent film, and a substrate, a nozzle plate, an ink jet head, and an ink jet recording device, and more particularly, it relates to a method for manufacturing a water-repellent film using a coupling agent, and a substrate, a nozzle plate, an ink jet head and an ink jet recording device including a water-repellent film manufactured by the method for manufacturing a water-repellent film.

2. Description of the Related Art

In an ink jet head used in an ink jet recording device, if an ink adheres to the surface of a nozzle plate, an ink droplet ejected from a nozzle may be affected to vary the direction of ejecting the ink droplet in some cases. If the ink adheres, it becomes difficult to allow an ink droplet to deposit in a prescribed position on a recording medium, which can be a cause of degradation of image quality.

Therefore, in order to improve the ejection performance by preventing an ink from adhering to the surface of a nozzle plate, or in order to improve the maintenance performance, various methods for forming a water-repellent film on the surface of a nozzle plate have been proposed.

For example, Japanese Patent Application Laid-Open No. 2010-030142 (PTL 1) below discloses that a plasma polymerized film is formed by using polyorganosiloxane, and particularly octamethyltrisiloxane, as a main raw material and then a water-repellent film is formed therefrom by using a coupling agent.

SUMMARY OF THE INVENTION

If a silane coupling agent is used for forming a water-repellent film, dehydrogenation condensation is caused between an OH group of a substrate and the silane coupling agent to form a silane coupling bond, and thus, the film strongly and closely adheres to the substrate. Therefore, it is effective to increase a Si—OH bond for improving the adhesion.

With respect to the water-repellent film of a nozzle plate described in PTL 1, it is disclosed that a plasma polymerized film having a Si—CH$_3$ bond is formed, and that a Si—OH bond is obtained by applying energy of UV, plasma or the like to the plasma polymerized film. In order to form such a thin film having a large number of Si—CH$_3$ bonds, however, a device was complicated for vaporizing and polymerizing a liquid raw material, such as polyorganosiloxane, containing a large amount of Si—CH$_3$.

Besides, although a Si—H bond having a peak intensity attributed to the Si—H bond of 0.001 to 0.2 with respect to a siloxane bond is used as the plasma polymerized film, the polyorganosiloxane used as the raw material does not contain a Si—H bond. Furthermore, the Si—H bond is used for inhibiting regular generation of a siloxane bond, for efficiently forming a Si skeleton having low crystallinity, and for attaining an excellent adhesion property, but it is not disclosed that the Si—H bond itself is positively utilized.

The present invention was accomplished in consideration of these circumstances, and an object of the present invention is to provide, by forming a film of a Si—H bond that can be more easily formed than a film having a Si—CH$_3$ bond and by using the Si—H bond as a Si—OH source, a method for manufacturing a highly adhesive water-repellent film at low cost, and a substrate, a nozzle plate, an ink jet head, and an ink jet recording device including the water-repellent film thus manufactured.

In order to achieve the above-described object, the present invention provides a method for manufacturing a water-repellent film, including an adhesion precursor film forming step of forming, on a substrate, an adhesion precursor film mainly of a Si—O bond with hydrogen directly bonded to Si; an irradiating step of irradiating the adhesion precursor film with excitation energy to increase an OH group present on a surface of the adhesion precursor film to thereby change the adhesion precursor film into an adhesion reinforcing film; and an organic film coating step of coating the adhesion reinforcing film with an organic film by using a silane coupling agent, wherein a content of the hydrogen directly bonded to Si in the adhesion precursor film is $1.0 \times 10^{17}$ atoms/cm$^2$ or more calculated in terms of a H$_2$ molecule.

The present inventors have found that a Si—H bond is changed into a Si—OH bond through irradiation with excitation energy. A Si—H bond can be prepared more inexpensively and more easily than a Si—CH$_3$ bond. Besides, according to the present invention, the content of the hydrogen bonded to Si in the adhesion precursor film formed in the adhesion precursor film forming step is $1.0 \times 10^{17}$ atoms/cm$^2$ or more calculated in terms of a H$_2$ molecule. Therefore, an OH group present on the substrate can be increased by changing the Si—H bond formed in the adhesion precursor film forming step into the Si—OH bond, so as to be reacted with the silane coupling agent in the organic film coating step subsequently performed, and thus, a water-repellent film can be highly densely manufactured. Accordingly, the water-repellent property can be improved.

Besides, since the Si—H bond can be changed into the Si—OH bond in the irradiating step, the amount of Si—OH bonds can be adjusted in accordance with the irradiation time of the excitation energy.

In the method for manufacturing a water-repellent film according to another aspect of the present invention, the adhesion precursor film is preferably formed by using, as a raw material, a silane material represented by SiH$_{4-x}$(CH$_3$)$_x$ (0≤x≤2).

In the method for manufacturing a water-repellent film according to the aspect of the present invention, since a silane material represented by SiH$_{4-x}$(CH$_3$)$_x$ (0≤x≤2) is used as the raw material for forming the adhesion precursor film, a silane material having at least two or more hydrogen atoms is used. Accordingly, the adhesion precursor film having a chemical structure in which hydrogen is directly bonded to Si can be easily formed on the substrate.

In the method for manufacturing a water-repellent film according to another aspect of the present invention, the adhesion precursor film forming step is preferably performed by cat-CVD process or plasma CVD process.

In the method for manufacturing a water-repellent film according to the aspect of the present invention, since the adhesion precursor film forming step is performed by cat-CVD process or plasma CVD process, the adhesion precursor film can be easily formed.

In the method for manufacturing a water-repellent film according to another aspect of the present invention, the excitation energy is preferably ultraviolet or plasma.

In the method for manufacturing a water-repellent film according to the aspect of the present invention, since ultraviolet or plasma is used as the excitation energy for increasing the OH group, an oxidation treatment can be performed for increasing the OH group merely in an irradiated region.

In the method for manufacturing a water-repellent film according to another aspect of the present invention, the organic film coating step is preferably performed by vapor deposition.

In the method for manufacturing a water-repellent film according to the aspect of the present invention, since the organic film coating step is performed by vapor deposition, the organic film can be easily formed.

In the method for manufacturing a water-repellent film according to another aspect of the present invention, the silane coupling agent is preferably a silane coupling agent containing fluorine.

In the method for manufacturing a water-repellent film according to the aspect of the present invention, since the silane coupling agent containing fluorine is used as the silane coupling agent, the water-repellent property can be effectively provided.

In order to achieve the above-described object, the present invention provides a substrate having been subjected to irregularity forming processing, including the water-repellent film manufactured by the aforementioned method for manufacturing a water-repellent film. In order to achieve the above-described object, the present invention provides a nozzle plate including the water-repellent film manufactured by the aforementioned method for manufacturing a water-repellent film.

In order to achieve the above-described object, the present invention provides an ink jet head including the above-described nozzle plate.

In order to achieve the above-described object, the present invention provides an ink jet recording device including the above-described ink jet head.

The water-repellent film manufactured by the above-described method for manufacturing a water-repellent film can be suitably used in a substrate, a nozzle plate, an ink jet head and an ink jet recording device.

According to a method for manufacturing a water-repellent film, and a substrate, a nozzle plate, an ink jet head, and an ink jet recording device of the present invention, a Si—OH bond can be highly densely formed by forming, on a substrate, a Si—H bond that can be easily formed and then substituting hydrogen with an OH group. Then, the Si—OH bond is reacted with a silane coupling agent so that a water-repellent film can be highly densely formed, and therefore, a water-repellent film having high adhesion and a high water-repellent property can be formed.

BRIEF DESCRIPTION OF THE DRAWINGS

FIG. 7 is a table illustrating results obtained in respective examples.

DETAILED DESCRIPTION OF EXEMPLARY EMBODIMENTS

Preferred embodiments of the present invention will now be described with reference to the accompanying drawings.

[Method for Preparing Adhesion Reinforcing Film]

First, a method for preparing an adhesion reinforcing film corresponding to an underlying film of a water-repellent film will be described. The method for preparing an adhesion reinforcing film includes: an adhesion precursor film forming step of forming, on a substrate, an adhesion precursor film mainly of a Si—O bond with hydrogen directly bonded to Si (which bond is sometimes designated as the "Si—H bond"); and an irradiating step of irradiating the adhesion precursor film with excitation energy for increasing, in amount, an OH group present on the surface of the adhesion precursor film. When this method for preparing an adhesion reinforcing film is employed, since a silica film having hydrogen directly bonded to Si can be more easily prepared than a film having an organic group directly bonded to Si, the Si—H bond can be highly densely formed. Accordingly, when the hydrogen bonded to Si is replaced with an OH group in the following irradiating step, the density of the OH group can be increased.

The respective steps will now be described.

[Adhesion Precursor Film Forming Step]

Figure 1A:
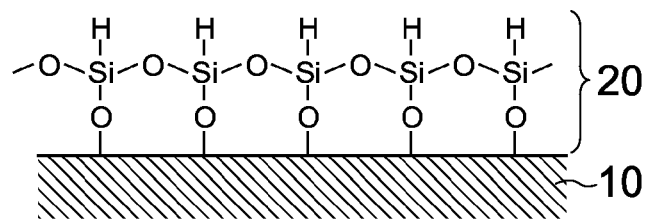
FIG. 1A is a diagram explaining a method for forming an adhesion reinforcing film.

FIG. 1A is a schematic diagram of a chemical structure obtained by forming an adhesion precursor film 20 on a substrate 10.

The material of the substrate 10 is preferably any of silicon, glass, a metal, a ceramic and a polymer film. In the present invention, no matter which of silicon, glass, a metal, a ceramic and a polymer film is employed, a strong water-repellent film can be formed.

Then, on this substrate 10, an adhesion precursor film having a Si—O bond mainly (or in a main chain) with a hydrogen (H) directly bonded to Si is formed. The adhesion precursor film mainly of a Si—O bond with hydrogen directly bonded to Si can be formed by performing plasma CVD (Chemical Vapor Deposition) process or cat-CVD process with a mixed gas of silane-based gas and oxygen introduced as plasma. If the adhesion precursor film is formed by the cat-CVD (Catalytic Chemical Vapor Deposition) process, a tungsten wire can be used as a catalyst. If the film is formed by the cat-CVD process with a tungsten wire used as a catalyst, a temperature in a prescribed range is preferably employed. This is because if the temperature is low, the reaction does not proceed, and if the temperature is high, the Si—H bond disappears during the film formation, resulting in forming a $SiO_2$-based thin film, and a sufficient amount of Si—H bonds cannot be obtained.

As the silane-based gas, for example, $SiH_{4-x}R_x$ ($0 \leq x \leq 2$) is preferably used. As for the material, in order to form an adhesion precursor film having a structure in which hydrogen is directly bonded to Si, a silane material in which two or more hydrogens are bonded to Si is preferably used. Besides, examples of R (an organic group) include, but not especially limited to, an aliphatic group, an aromatic group or a heterocyclic group. Examples include methyl, ethyl, n-propyl, isopropyl, n-butyl, isobutyl, sec-butyl, t-butyl, n-pentyl, isopentyl, 2-methylbutyl, 1-methylbutyl, n-hexyl, isohexyl, 3-methylpentyl, 2-methylpentyl, 1-methylpentyl, heptyl, octyl, isooctyl, 2-ethylhexyl, nonyl, decyl, undecyl, dodecyl, tetradecyl, hexadecyl, octadecyl, eicosyl, cyclopentyl, cyclohexyl, adamantyl, vinyl, propenyl, butenyl, acrylic, methacryl, octynyl, dodecenyl, undecenyl, cyclohexenyl, phenyl, tolyl, pyrenyl, phenanthrenyl, naphthyl, biphenylyl, terphenylyl, benzyl, phenethyl, and naphthylmethyl, and also heterocyclic groups derived from the aforementioned various heterocycles. From the viewpoint of the manufacturing cost, a methyl group or an ethyl group having a simpler structure can be preferably used, and a methyl group is particularly preferred.

It is noted that the Si—H bond alone is illustrated for the description in FIG. 1A. Actually, there can be, on the surface of the adhesion precursor film 20, a Si—R bond of an organic group (R) directly bonded to Si and a Si—OH bond of an OH group directly bonded to Si, which are not illustrated in the drawing.

As for the amount of Si—H bonds thus formed, the content of hydrogen bonded to Si in a thin film per unit area of the adhesion precursor film 20 is $1.0 \times 10^{17}$ atoms/cm$^2$ or more in terms of a $H_2$ molecule. If the amount of Si—H bonds falls in this range, the Si—H bonds can be changed into Si—OH bonds to highly densely form OH groups in the following irradiating step.

Incidentally, for the measurement of the content of hydrogen directly bonded to Si, for example, a temperature programmed desorption gas analyzer (TDS) can be used for obtaining an amount of hydrogen generated (M/z=2) to be used as a quantitative index.

[Irradiating Step]

Figure 1B:
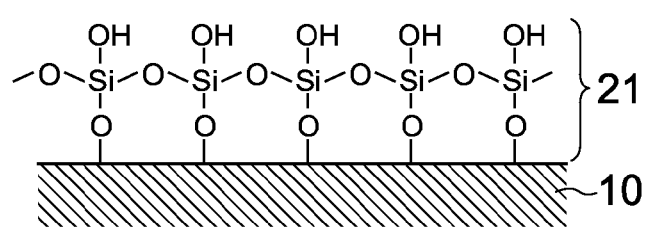
FIG. 1B is a diagram explaining the method for forming the adhesion reinforcing film.

When the adhesion precursor film 20 obtained in the adhesion precursor film forming step is irradiated with excitation energy, the adhesion precursor film is changed into an adhesion reinforcing film 21 by removing the hydrogen and changing the Si—H bond into a Si—OH bond. FIG. 1B is a schematic diagram of a chemical structure obtained after the irradiating step.

As the conditions of a treatment gas and a treatment method, conditions, a method and the like described in Japanese Patent Application Laid-Open No. 2008-105231 can be suitably employed.

In the present invention, as the excitation energy, an energy line such as ultraviolet or plasma can be used. When this method is employed, an irradiated region alone can be subjected to an oxidation treatment by the energy line, and thus, the OH group can be increased in amount.

If the plasma irradiation is employed, oxygen plasma irradiation using a gas containing oxygen gas as a gaseous species for generating plasma is preferably employed. If the oxygen plasma irradiation is employed, oxygen plasma can break the bond between hydrogen and Si to introduce an OH group onto the adhesion precursor film.

Besides, the amount of Si—H bonds to be changed into Si—OH bonds can be adjusted in accordance with the irradiation time of the excitation energy, and hence, the amount of OH on the surface of the thin film can be controlled.

Besides, since the density of the Si—OH groups is increased by the irradiating step to obtain the adhesion reinforcing film 21, the adhesion reinforcing film obtained after performing the adhesion precursor film forming step does not contain a large amount of OH groups and is not hydrophilic. Thereafter, the OH group is increased in amount to make the film hydrophilic by performing the irradiating step. Accordingly, a hydrophilic film obtained after the irradiating step may be degraded in its hydrophilic property through change with time, and in manufacturing a water-repellent film thereafter, a sufficient amount of OH groups may not be formed on the thin film in some cases. In the method for preparing an adhesion reinforcing film of the present embodiment, the adhesion precursor film is stored with the Si—H bond formed on the surface thereof by the adhesion precursor film forming step, and when it is to be caused to function as an adhesion reinforcing film (a hydrophilic film), the density of OH groups is increased by performing the irradiating step, and the resultant is coated with a silane coupling agent by performing an organic film coating step, and thus, an organic film with a high density can be formed. Besides, when the adhesion precursor film is to be caused to function as the hydrophilic film, the irradiating step is performed to improve its hydrophilic property.

Since the adhesion reinforcing film thus formed has a hydrophilic property, it can be suitably used on the surface of a common channel (illustrated with a reference numeral 255 in FIG. 5) of an ink jet head. Besides, it can be used on the surface of defogging glass.

[Method for Manufacturing Water-Repellent Film] A method for manufacturing a water-repellent film will now be described. The method for manufacturing a water-repellent film of the present embodiment includes an organic film coating step of coating the adhesion reinforcing film 21 prepared as described above with an organic film by using a silane coupling agent.

[Organic Film Coating Step]

Figure 2A:
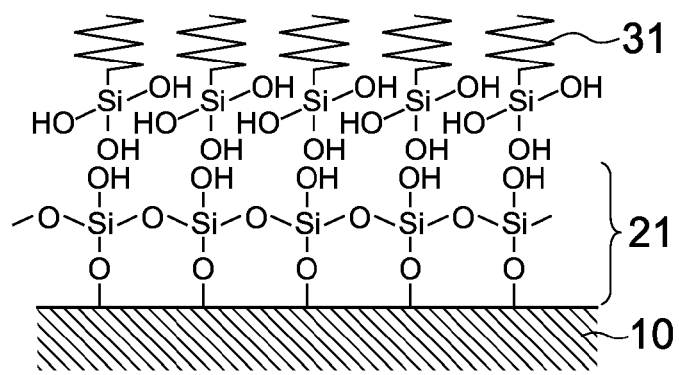
FIG. 2A is a diagram explaining a method for forming a water-repellent film.
Figure 2B:
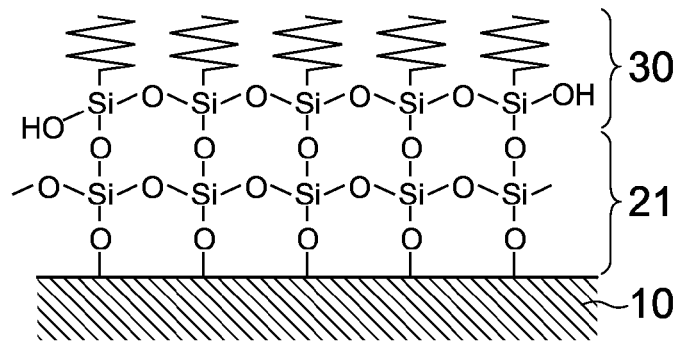
FIG. 2B is a diagram explaining the method for forming the water-repellent film.

The organic film coating step is a step of coating the adhesion reinforcing film 21 with an organic film by vapor depositing a silane coupling agent. FIG. 2A is a schematic diagram of a chemical structure obtained before bonding the silane coupling agent and the adhesion reinforcing film, and FIG. 2B is a schematic diagram of a chemical structure obtained after bonding them.

As the silane coupling agent 31, agents of a chlorine-type, a methoxy-type, an ethoxy-type, an isocyanate-type or the like are preferably used. Since a large number of hydroxyl groups: OH groups serving as a reaction site of the silane coupling agent have been formed on the surface of the adhesion reinforcing film 21, the silane coupling agent is highly densely bonded to the adhesion reinforcing film 21 by coating, and a water-repellent film 30 with a high density can be thus formed.

The water-repellent film 30 can be formed by a physical vapor deposition process such as evaporation deposition process. The evaporation deposition process is a process in which a substrate for forming a film is set in a vacuum chamber, and a material to be formed into a film is evaporated in the vacuum chamber under evaporation conditions (namely, conditions for attaining a sufficient vapor pressure) for forming a film. In using the silane coupling agent, a process in which a film is formed by evaporating the silane coupling agent by heating is usually employed.

As other film forming method, the film can be formed by spin coating or dipping process. The film can be formed by applying the silane coupling agent used as a material on a film-forming substrate by spin coating or dipping, and heating the resultant.

The silane coupling agent is a silicon compound represented by $Y_nSiX_{4-n}$ (n=1, 2, 3). Here, Y represents a comparatively inactive group such as an alkyl group, or a group containing a reactive group such as a vinyl group, an amino group or an epoxy group. X represents a group bondable through a condensation with a hydroxyl group or adsorbed water present on a substrate surface, such as halogen, a methoxy group, an ethoxy group or an acetoxy group. The silane coupling agent is widely used, in manufacturing a composite material containing an organic substance and an inorganic substance such as glass fiber reinforced plastics, for mediating these substances, and if Y represents an inactive group such as an alkyl group, it provides a resultant modified surface with a property such as an adhesion or friction preventing property, a gloss retaining property, a water-repellent property, or a lubricating property. Alternatively, if a reactive group is contained, the agent is used mainly for improving an adhesion property.

Besides, a surface modified by using a fluorine-based silane coupling agent in which a linear fluorocarbon chain is introduced as Y has low surface free energy similarly to the surface of PTFE (polytetrafluoroethylene), is improved in the water-repellent, lubricating and releasing properties, and also shows an oil-repellent property.

As linear fluoroalkylsilane, for example, $Y=CF_3CH_2CH_2$, $CF_3(CF_2)_3CH_2CH_2$, $CF_3(CF_2)_7CH_2CH_2$ or the like can be used.

Alternatively, a material having, as the Y portion, a perfluoropolyether (PFPE) group ($—CF_2—O—CF_2—$) can be used.

Furthermore, a material having a silane coupling group bonded not to one side but to both sides, $X_3SiYSiX_3$, can be used as the silane coupling agent.

Alternatively, any of commercially available silane coupling water-repellent materials, such as OPTOOL (registered trademark) manufactured by Daikin Industries, Ltd., DURASURF manufactured by Harves Co., Ltd., Novec (registered trademark) EGC1720 manufactured by Sumitomo 3M Ltd., Fluorolink (registered trademark) S-10 manufactured by Solvay Solexis, NANOS manufactured by T & K, SIFEL KY-100 manufactured by Shin-Etsu Chemical Co., Ltd., and CYTOP M type manufactured by Asahi Glass Co., Ltd., can be used.

It is noted that FIG. 2A illustrates a state where the silane coupling agent 31 has been hydrolyzed to substitute X by an OH group. Thereafter, dehydrogenation condensation occurs between OH groups on the adhesion reinforcing film 21 or between adjacent silane coupling agents 31, so that a film having the structure as illustrated in FIG. 2B can be formed.

<Substrate Including Manufactured Water-Repellent Film>

Next, a substrate including a water-repellent film manufactured by the method for manufacturing a water-repellent film of the present invention will be described. According to the present invention, a water-repellent film can be formed on a substrate not having an irregular structure, or after forming a water-repellent film on a substrate not having an irregular structure, an irregular structure can be imparted. Alternatively, a water-repellent film can be formed on a substrate having an irregular structure. In particular, it is preferable to form a water-repellent film on a substrate having an irregular structure. If the processing for forming an irregular structure is performed after forming a water-repellent film, there is a possibility that the performance of the water-repellent film can be changed because a foreign substance produced in the processing adheres to the water-repellent film or the water-repellent film is heated during the processing. Furthermore, since the method for manufacturing a water-repellent film of the present invention can be performed also by a gas phase method, a water-repellent film can be effectively manufactured on a substrate having an irregular structure.

In the case where an irregular structure is formed in a substrate, for example, if a silicon substrate is used, wet etching using a solution of KOH or the like, a reactive ion etching using a reactive gas such as a $SF_6$ gas, or the like can be employed. In the case where a water-repellent film is formed on a substrate not having an irregular structure and irregularity forming processing is performed after the film formation, the water-repellent film may be damaged in some cases by a strong reactive solution such as KOH or plasma damage caused in the reactive ion etching. Therefore, the irregularity forming processing is preferably performed by a gas phase method.

An example of device using a substrate having an irregular structure includes a MEMS (Micro Electro Mechanical Systems) using a silicon substrate as the substrate, and the substrate can be used in application of, for example, an optical scanner, a cantilever of an AFM (Atomic Force Microscope), a pressure sensor, an acceleration sensor or the like. In particular, a substrate including a water-repellent film manufactured by the present invention is suitably used in a structure to be brought into a direct contact with a solution, and can be used in a microchannel device used in a DNA (deoxyribonucleic acid) chip or the like. Besides, it can be more suitably used in a substrate having an irregular structure required of high durability, such as a nozzle plate of an ink jet head.

<Overall Structure of Ink Jet Recording Device>

Next, as examples of the application of a water-repellent film formed by a method for forming a water-repellent film of the present invention, a nozzle plate, an ink jet head including a nozzle plate, and an ink jet recording device will be described. The method for forming a water-repellent film of the present invention can be suitably employed in a method for manufacturing a nozzle plate, a method for manufacturing an ink jet head and a method for manufacturing an ink jet recording device.

Figure 3:
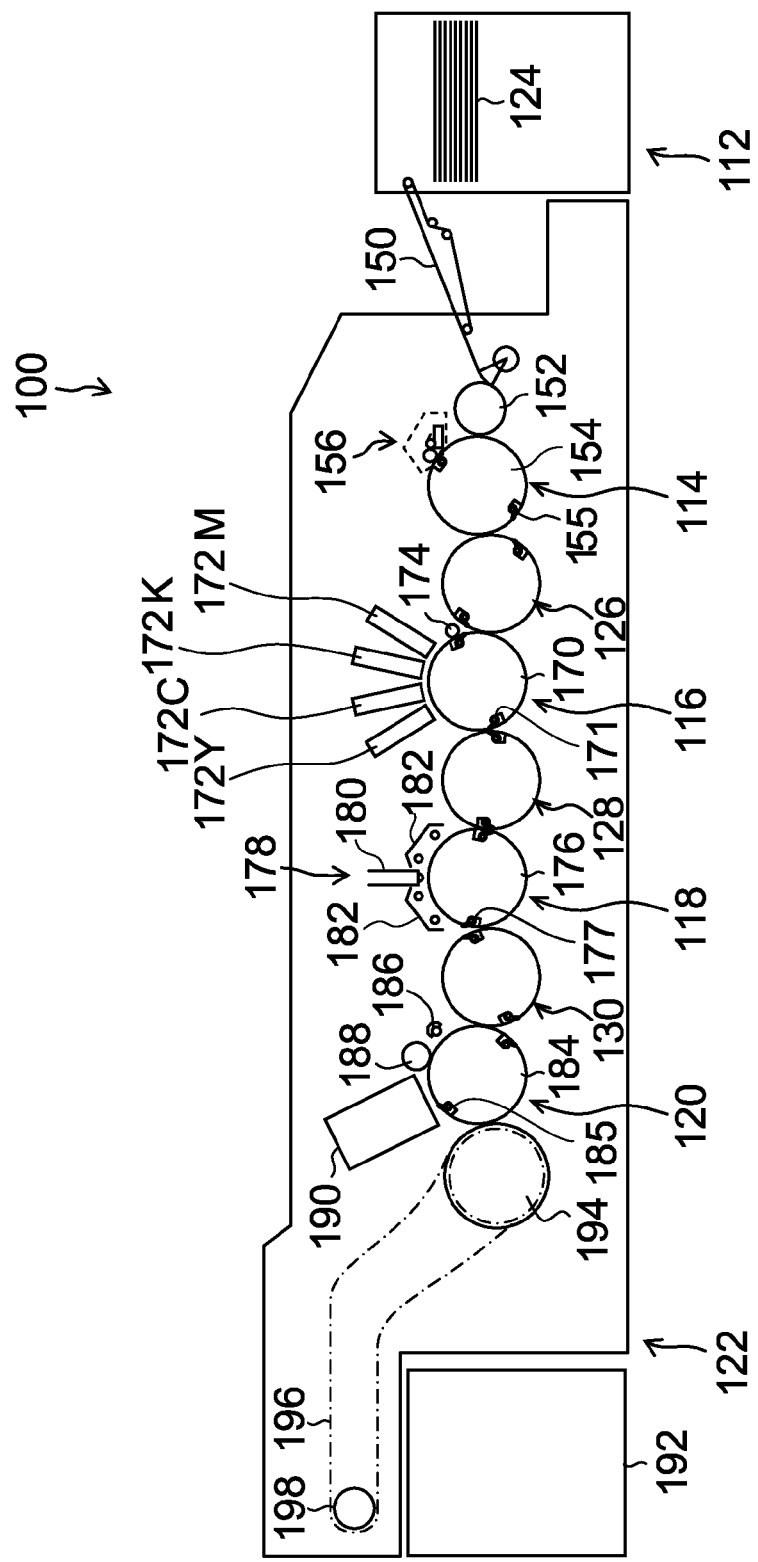
FIG. 3 is an overall structure diagram illustrating a rough structure of an ink jet recording device.

FIG. 3 is a structure diagram of an ink jet recording device. This ink jet recording device 100 is an ink jet recording device of impression cylinder direct imaging type in which a desired color image is formed by ejecting inks of a plurality of colors from ink jet heads 172M, 172K, 172C and 172Y onto a recording medium 124 (hereinafter sometimes referred to as "paper" for convenience) held on an impression cylinder (an imaging drum 170) of an imaging section 116. The ink jet recording device 100 is an on-demand type image forming device employing a two-component reaction (coagulation) method for forming an image on the recording medium 124 by applying a treatment liquid (a coagulation treatment liquid in this case) onto the recording medium 124 before ejecting the inks to cause a reaction between the treatment liquid and each ink liquid.

As illustrated in this drawing, the ink jet recording device 100 includes a paper feeding section 112, a treatment liquid applying section 114, the imaging section 116, a drying section 118, a fixing section 120, and a discharging section 122.

(Paper Feeding Section)

The paper feeding section 112 is a mechanism for supplying a recording medium 124 to the treatment liquid applying section 114, and in this paper feeding section 112, the recording media 124 in the form of sheets are stacked. The paper feeding section 112 is provided with a paper feed tray 150, and the recording media 124 are supplied through this paper feed tray 150 one by one to the treatment liquid applying section 114.

(Treatment Liquid Applying Section)

The treatment liquid applying section 114 is a mechanism for applying a treatment liquid onto a recording surface of the recording medium 124. The treatment liquid contains a color material coagulating agent for coagulating a color material (a pigment in this example) contained in an ink to be applied in the imaging section 116, and when this treatment liquid comes into contact with the ink, separation between the color material and a solvent is accelerated in the ink.

As illustrated in FIG. 3, the treatment liquid applying section 114 includes a paper feed cylinder 152, a treatment liquid drum 154 and a treatment liquid applying device 156. The treatment liquid drum 154 is a drum for holding and rotatively conveying the recording medium 124. The treatment liquid drum 154 has, on its outer circumferential surface, gripping means (gripper) 155 in the shape of a claw, so that the leading edge of the recording medium 124 can be held by gripping the recording medium 124 between the claw of the gripping means 155 and the circumferential surface of the treatment liquid drum 154.

On the outside of the treatment liquid drum 154, the treatment liquid applying device 156 is provided to oppose the circumferential surface thereof. The treatment liquid applying device 156 includes a treatment liquid container for holding the treatment liquid, an anilox roller partially dipped in the treatment liquid held in the treatment liquid container, and a rubber roller pressed against the anilox roller and the recording medium 124 held on the treatment liquid drum 154 for transferring treatment liquid measured its amount onto the recording medium 124. When this treatment applying device 156 is used, the treatment liquid can be applied to the recording medium 124 while weighing the treatment liquid.

The recording medium 124 to which the treatment liquid has been applied in the treatment liquid applying section 114 is transferred from the treatment liquid drum 154 via an intermediate conveying section 126 to the imaging drum 170 of the imaging section 116.

(Imaging Section)

The imaging section 116 includes the imaging drum (second conveyor) 170, a paper pressing roller 174, and the ink jet heads 172M, 172K, 172C and 172Y. The imaging drum 170 has, on its outer circumferential surface, gripping means (gripper) 171 in the shape of a claw similarly to the treatment liquid drum 154. The recording medium 124 fixed on the imaging drum 170 is conveyed with its recording surface facing outward, and the inks are applied onto this recording surface by the ink jet heads 172M, 172K, 172C and 172Y.

Each of the ink jet heads 172M, 172K, 172C and 172Y is preferably a full-line type ink jet recording head (ink jet head) having a length corresponding to the maximum width of an image forming area of the recording medium 124. On its ink ejection surface, a nozzle array including a plurality of nozzles for ejecting an ink arranged over the whole width of the image forming area is formed. Each of the ink jet heads 172M, 172K, 172C and 172Y is provided to extend along a direction perpendicular to the conveyance direction of the recording medium 124 (the rotation direction of the imaging drum 170).

When droplets of the inks of the corresponding colors are respectively ejected from the ink jet heads 172M, 172K, 172C and 172Y toward the recording surface of the recording medium 124 adhesively held on the imaging drum 170, the inks come into contact with the treatment liquid having been applied to the recording surface in the treatment liquid applying section 114, so as to coagulate the color materials (pigments) dispersed in the inks to form color material coagulates. Thus, migration and the like of the color materials is prevented from occurring on the recording medium 124, and an image is formed on the recording surface of the recording medium 124.

The recording medium 124 having the image formed in the imaging section 116 is transferred from the imaging drum 170 via an intermediate conveying section 128 to a drying drum 176 of the drying section 118.

(Drying Section)

The drying section 118 is a mechanism for drying a water content contained in the solvent separated by the color material coagulating function, and as illustrated in FIG. 3, includes the drying drum 176 and a solvent drying device 178.

The drying drum 176 has, on its outer circumferential surface, gripping means (gripper) 177 in the shape of a claw similarly to the treatment liquid drum 154, so that the leading edge of the recording medium 124 can be gripped with this gripping means 177.

The solvent drying device 178 is disposed in a position opposing the outer circumferential surface of the drying drum 176, and includes a plurality of heaters (such as halogen heaters or infrared heaters) 182 and hot air blowing nozzles 180 disposed between adjacent heaters 182.

The recording medium 124 having been subjected to a drying treatment in the drying section 118 is transferred from the drying drum 176 via an intermediate conveying section 130 to a fixing drum 184 of the fixing section 120.

(Fixing Section)

The fixing section 120 includes the fixing drum 184, a halogen heater 186, a fixing roller 188, and an inline sensor 190. The fixing drum 184 has, on its outer circumferential surface, gripping means (gripper) 185 in the shape of a claw similarly to the treatment liquid drum 154, so that the leading edge of the recording medium 124 can be gripped with this gripping means 185.

Through the rotation of the fixing drum 184, the recording medium 124 is conveyed with its recording surface facing outward, and this recording surface is subjected to preheating by the halogen heater 186, a fixing treatment by the fixing roller 188, and an inspection by the inline sensor 190.

In the fixing section 120, a thermoplastic resin fine particle contained in a thin image layer formed in the drying section 118 is molten by heating and pressing by the fixing roller 188, so as to be fixed on the recording medium 124. Besides, when the surface temperature of the fixing drum 184 is set to 50° C. or more, the recording medium 124 held on the outer circumferential surface of the fixing drum 184 is heated also from the rear surface thereof to accelerate the drying, and thus, image breakage can be prevented from occurring in the fixing operation, and image strength can be improved by an effect of increasing the temperature of the image.

Besides, if a UV curable monomer is contained in the ink, an image is irradiated with UV in the fixing section including a UV irradiation lamp after sufficiently volatilizing a water content in the drying section, to cure and polymerize the UV curable monomer, and thus, the image strength can be improved.

(Discharging Section)

As illustrated in FIG. 3, the discharging section 122 is provided continuously to the fixing section 120. The discharging section 122 includes a discharge tray 192, and a transfer cylinder 194, a conveyance belt 196 and a tension roller 198 are provided between the discharge tray 192 and the fixing drum 184 of the fixing section 120 so as to oppose and connect them. The recording medium 124 is fed to the conveyance belt 196 by the transfer cylinder 194 to be discharged onto the discharge tray 192.

Furthermore, although not illustrated in the drawing, the ink jet recording device 100 of this example includes, in addition to the aforementioned components, ink storing/charging sections for respectively supplying the inks to the ink jet heads 172M, 172K, 172C and 172Y, and means for supplying the treatment liquid to the treatment liquid applying section 114, as well as a head maintenance section for cleaning each of the ink jet heads 172M, 172K, 172C and 172Y (by, for example, wiping the nozzle surfaces, purging and sucking the nozzles), a position detection sensor for detecting the position of the recording medium 124 on a paper conveyance path, and a temperature sensor for detecting the temperature of each component.

Although the ink jet recording device of a drum conveyance system has been described with reference to FIG. 3, the present invention is not limited to this system, but may be used also in an ink jet recording device of a belt conveyance system or the like.

[Structure of Ink Jet Head]

Next, the structure of the ink jet heads 172M, 172K, 172C and 172Y will be described. Incidentally, since each of the ink jet heads 172M, 172K, 172C and 172Y have a common structure, a reference numeral 250 is representatively used in the following description to refer to the head.

Figure 4A:
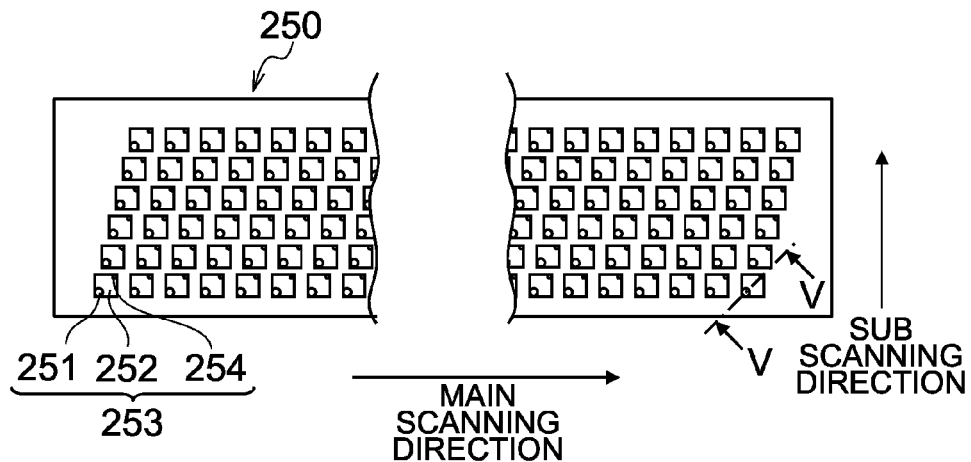
FIG. 4A is a plan perspective view illustrating an example of a structure of an ink jet head.
Figure 4B:
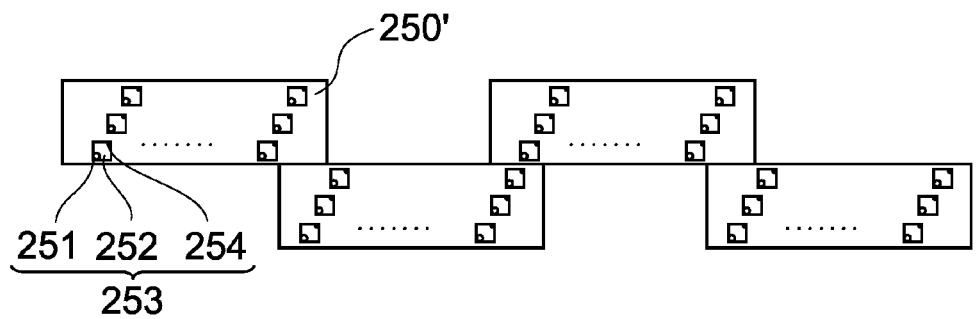
FIG. 4B is a plan perspective view illustrating the example of the structure of the ink jet head.
Figure 5:
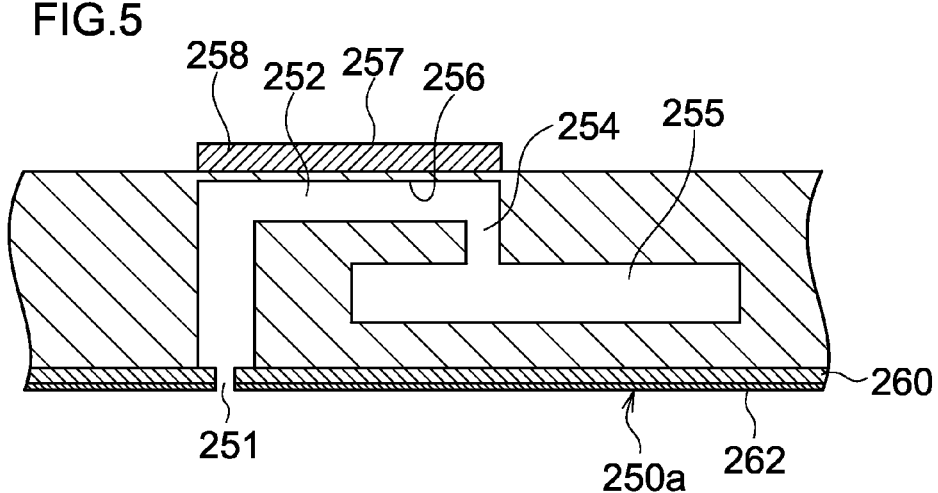
FIG. 5 is a cross-sectional view taken on a line V-V of FIG. 4A.

FIG. 4A is a plan perspective view illustrating an example of the structure of the ink jet head 250, and FIG. 4B is a plan perspective view illustrating another example of the structure of the ink jet head 250. FIG. 5 is a cross-sectional view illustrating the three-dimensional structure of an ink chamber unit (a cross-sectional view taken on line V-V of FIG. 4A).

In order to increase the pitch density of dots to be formed on recording paper, it is necessary to increase the pitch density of nozzles provided in the ink jet head 250. The ink jet head 250 of this example has a structure in which a plurality of ink chamber units 253, each including a nozzle 251 corresponding to a hole ejecting an ink droplet, a pressure chamber 252 corresponding to the nozzle 251 and the like, are arranged (two-dimensionally) in a staggered matrix as illustrated in FIG. 4A. Thus, the substantial nozzle interval (projected nozzle pitch) of the nozzles projected to align along the lengthwise direction of the head (a main scanning direction perpendicular to the paper feeding direction) can be increased to attain a high density.

The arrangement in which one or more nozzle rows are disposed along the direction substantially perpendicular to the paper feeding direction over a length corresponding to the whole width of the recording medium 124 is not limited to the aforementioned example. Instead of the structure of FIG. 4A, for example, short head blocks (head chips) 250', each of which includes a plurality of nozzles 251 two-dimensionally arranged, may be arranged and connected in a staggered matrix as illustrated in FIG. 4B, so as to obtain a line head including a nozzle row having a length corresponding to the whole width of the recording medium 124. Alternatively, although not illustrated in the drawing, short heads may be arranged in a row to constitute a line head.

As illustrated in FIG. 5, each nozzle 251 is formed in a nozzle plate 260 constructing an ink ejection surface 250a of the ink jet head 250. The nozzle plate 260 is made of, for example, a silicon-based material such as Si, $SiO_2$, SiN or quartz glass, a metal material such as Al, Fe, Ni, Cu or an alloy containing any of these metals, an oxide material such as alumina or iron oxide, a carbon-based material such as carbon black or graphite, or a resin-based material such as polyimide.

On the surface (the surface on the ink ejection side) of the nozzle plate 260, a water-repellent film 262 having a water-repellent property to the ink is formed so as to prevent the ink from adhering thereto.

The pressure chamber 252 provided correspondingly to each nozzle 251 has a substantially square plan shape, and has the nozzle 251 and a supply port 254 in both corners on one diagonal. Each pressure chamber 252 communicates with a common channel 255 via the supply port 254. The common channel 255 communicates with an ink supply tank (not shown) corresponding to an ink supply source, and the ink supplied from the ink supply tank is distributedly supplied via the common channel 255 to the respective pressure chambers 252.

A diaphragm 256 constructing the top surface of the pressure chamber 252 and also working as a common electrode is connected to a piezoelectric element 258 having an individual electrode 257, and when a drive voltage is applied to the individual electrode 257, the piezoelectric element 258 is deformed to eject the ink through the nozzle 251. When the ink has been ejected, a fresh ink is supplied to the pressure chamber 252 through the supply port 254 from the common channel 255.

It is noted that the arrangement structure of the nozzles is not limited to those illustrated in the drawings, but that any of various nozzle arrangement structures, such as an arrangement structure in which one row of nozzles is disposed along a sub scanning direction, can be applied.

Besides, the printing method is not limited to the method using a line head, but a serial method as follows may be applied: A short head shorter than a length along the widthwise direction (the main scanning direction) of paper is traversed along the widthwise direction of the paper to perform a printing operation along the widthwise direction, and after performing one printing operation along the widthwise direction, the paper is moved by a prescribed length in a direction perpendicular to the widthwise direction (the sub scanning direction) for performing the printing operation along the widthwise direction in a next printing area of the paper, so that the printing operation can be performed over the whole printing area of the paper by repeating this operation.

EXAMPLES

Example 1

On a silicon substrate with a thickness of 625 μm, a film mainly of a Si—O bond with hydrogen and an organic group directly bonded to Si was formed as follows. The film formation was performed by the cat-CVD process, and a mixed gas of monomethylsilane ($CH_3SiH_3$) and oxygen was introduced into a chamber for forming the film. A tungsten wire was used as a catalyst, and its temperature was set to 1400° C.

When the thus formed thin film was measured by using a FT-IR (Fourier transform infrared spectrophotometer), all of a Si—O bond, a Si—H bond and a Si—$CH_3$ bond were observed. With respect to this film, an amount of hydrogen generated (M/z=2) and an amount of $CH_3$ generated (M/z=15) integrated while heating the film to 0 to 800° C. are determined with a temperature programmed desorption gas analyzer (TDS) manufactured by ESCO Ltd. and the obtained values were used as quantitative indexes of the Si—H bond and the Si—$CH_3$ bond. Besides, as for a Si—OH bond, the temperature of water eliminated at 350° C. or more was defined as an amount of OH group (350° C. or more).

This film was irradiated for a prescribed time by a low-pressure mercury lamp (17 mW/cm²), PM1102-3 manufactured by Sen Lights Co., Ltd., and a sample obtained after the prescribed time irradiation was measured for the amount of hydrogen generated, the amount of $CH_3$ generated, and the amount of OH group similarly by using the temperature programmed desorption gas analyzer (TDS) manufactured by ESCO Ltd.

Example 2

A film was formed in the same manner as in Example 1 except that the temperature of a tungsten wire as a catalyst was set to 1300° C.

Example 3

On a silicon substrate with a thickness of 625 μm, a film mainly of a Si—O bond with hydrogen and an organic group directly bonded to Si was formed by introducing a mixed gas of monomethylsilane ($CH_3SiH_3$) and oxygen into a chamber having a parallel plate plasma electrode. Next, the film was irradiated with UV by the same method as in Example 1, and the amount of hydrogen generated, the amount of $CH_3$ generated and the amount of OH group were measured before the UV irradiation and after a prescribed time.

Comparative Example 1

On a silicon substrate with a thickness of 625 μm, a film mainly of a Si—O bond with hydrogen and an organic group directly bonded to Si was formed by the cat-CVD process by introducing a mixed gas of monomethylsilane ($CH_3SiH_3$) and oxygen into a chamber. A tungsten wire was used as a catalyst, and its temperature was set to 1600° C. Next, the film was irradiated with UV by the same method as in Example 1, and the amount of hydrogen generated, the amount of $CH_3$ generated and the amount of OH group were measured before the UV irradiation and after a prescribed time.

Comparative Example 2

On a silicon substrate with a thickness of 625 μm, a film mainly of a Si—O bond with hydrogen and an organic group directly bonded to Si was formed by introducing TEOS (Si$(OC_2H_5)_4$: tetraethyl orthosilicate) into a vacuum chamber having parallel plate plasma electrode generated by thermal vaporization. The film formation was performed by using a CVD apparatus, CC-200 manufactured by Ulvac Inc. Next, the film was irradiated with UV by the same method as in Example 1, and the amount of hydrogen generated, the amount of $CH_3$ generated and the amount of OH group were measured before the UV irradiation and after a prescribed time.

(Results)

Figure 6:
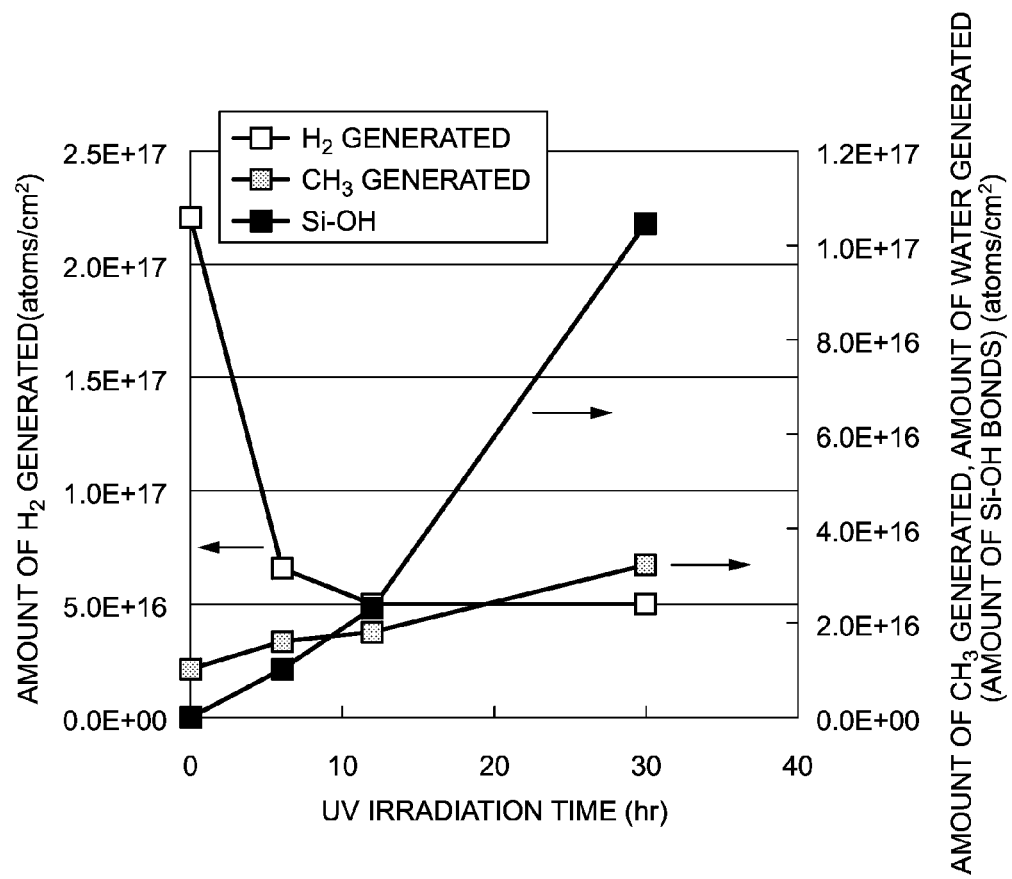
FIG. 6 is a graph illustrating results obtained in Example 1.

The amount of hydrogen generated, the amount of $CH_3$ generated and the amount of OH group obtained before the UV irradiation and after the UV irradiation performed for a prescribed time in the thin film of Example 1 having the Si—O bond, the Si—H bond and the Si—$CH_3$ bond are illustrated in a graph of FIG. 6, and the results of each of the examples and comparative examples are illustrated in FIG. 7. It is noted that the left ordinate of FIG. 6 indicates the amount of hydrogen generated, and the right ordinate of FIG. 6 indicates the amount of $CH_3$ generated and an amount of water generated (an amount of Si—OH bonds).

In Example 1, the amount of hydrogen generated was $2.2 \times 10^{17}$ atoms/$cm^2$, and it is understood that the film contained a considerably larger amount of Si—H bonds than Si—$CH_3$ bonds.

It is also understood that hydrogen decomposes and the OH group increases through the UV irradiation. Specifically, it is presumed that the Si—H bond decomposes to form the Si—OH bond. On the other hand, since there is no correlation between the Si—$CH_3$ bond and the OH group and the amount of Si—$CH_3$ bond is small, it is presumed that the Si—$CH_3$ bond is not involved in the increase of the OH group.

Besides, although the respective bonds were evaluated by using the TDS in the present example, similar evaluation can be made by the FT-IR method. In this case, with a background spectrum of a substrate (such as a silicon substrate or a glass substrate) before forming a film precedently measured, the measurement can be performed by obtaining difference spectrum of the substrate between before and after the film formation. Furthermore, the measurement is preferably performed by a transmission method because a spectrum can be thus more clearly observed.

In the FT-IR method, a peak of the Si—H bond can be observed in the vicinity of $2150 \pm 50$ $cm^{-1}$, and a peak of the Si—$CH_3$ bond can be observed in the vicinity of $1270 \pm 50$ $cm^{-1}$. Besides, the generation of the Si—OH bond can be evaluated by the FT-IR. Oscillations (peaks) can be found in the vicinity of $3450$ $cm^{-1}$ for a free water molecule, in the vicinity of $3660$ $cm^{-1}$ for a water molecule hydrogen-bonded to a Si—OH bond, and in the vicinity of $3474$ $cm^{-1}$ for a Si—OH bond itself.

When this film is irradiated with UV, the peak of the Si—H bond disappears but the peak of the Si—$CH_3$ bond remains. Therefore, it is understood, similarly to the data obtained by the TDS, that the Si—H bond is involved in the generation of OH. Incidentally, when the measurement is performed by the FT-IR method, the peak corresponding to the Si—H bond completely disappears in a sample obtained after performing the UV irradiation for 30 minutes, but generation of hydrogen is observed in the TDS measurement. Therefore, it can be said that the TDS measurement is a more sensitive measurement method, but even when the FT-IR method is employed, the same result can be obtained by a similar method. Besides, with respect to the generation of Si—OH, its peak is buried in a peak of adsorbed water because the formed thin film has merely a small surface area, and hence, it is difficult to quantitatively determine the peak by the FT-IR in many cases, and it can be clearly quantitatively determined similarly by the TDS measurement.

Also in Example 2, the amount of hydrogen generated was $1.3 \times 10^{17}$ atms/$cm^2$ in a sample before the UV irradiation, and it is presumed that a large amount of Si—H bonds were contained. Besides, the OH group was also increased through the UV irradiation performed for 2 hours.

Also in Example 3, the amount of hydrogen generated was $2.4 \times 10^{17}$ atms/$cm^2$ in a sample before the UV irradiation, and it is presumed that a large amount of Si—H bonds were contained. Besides, the amount of OH group was also increased through the UV irradiation similarly to Example 1, and it is presumed that the amount of Si—OH groups were increased. Also for the behavior by the FT-IR, substantially the same behavior as that obtained in Example 1 was obtained.

Furthermore, each of the samples obtained after the UV irradiation of Examples 1 to 3 was used for forming a water-repellent film by using a silane coupling agent, the OH group was increased in accordance with the UV irradiation time, and hence, it could be confirmed that the adhesion is thus improved.

Since monomethylsilane having the Si—H bond is used as a raw material in Examples 1 to 3, the film having a larger amount of Si—H bonds can be formed as compared with the case where silicone (represented by the following formula) is used as a raw material as described in PTL 1 (Japanese Patent Application Laid-Open No. 2010-030142), and it is presumed that this Si—H bond is involved in the Si—OH bond.

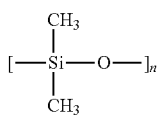

[Formula 1]

In Comparative Example 1, the hydrogen content attained after the thin film formation was as small as $1.4 \times 10^{16}$ atoms/cm$^2$. Besides, even when this film was irradiated with UV, the effect to increase the OH group was not shown. In Comparative Example 1, a sufficient amount of OH groups could not be obtained, but also the OH group could not be controlled by the UV irradiation. Although Comparative Example 1 is the same as Example 1 in using the raw material having the Si—H bond, the Si—H bond had disappeared during the film formation, resulting in forming a SiO$_2$-based thin film more stable and having a smaller amount of free groups. This seems to be the reason why the effect to increase the OH group through the UV irradiation could not be attained.

In Comparative Example 2, the hydrogen content attained after the thin film formation was as small as $3.9 \times 10^{15}$ atoms/cm$^2$. Besides, even when this film was irradiated with UV, the effect to increase the OH group was not shown similarly to Comparative Example 1. In Comparative Example 2, it is presumed that a film having a Si—H bond was difficult to form because the raw material did not have a Si—H bond.

What is claimed is:

1. A method for manufacturing a water-repellent film, comprising:
   an adhesion precursor film forming step of forming, on a substrate, an adhesion precursor film mainly of a Si—O bond with hydrogen directly bonded to Si;
   an irradiating step of irradiating the adhesion precursor film with excitation energy to increase an OH group present on a surface of the adhesion precursor film to change the adhesion precursor film into an adhesion reinforcing film; and
   an organic film coating step of coating the adhesion reinforcing film with an organic film by using a silane coupling agent,
   wherein a content of the hydrogen directly bonded to Si in the adhesion precursor film is $1.0 \times 10^{17}$ atoms/cm$^2$ or more in terms of a H$_2$ molecule.

2. The method for manufacturing the water-repellent film according to claim 1,
   wherein the adhesion precursor film is formed by using, as a raw material, a silane material represented by SiH$_{4-x}$(CH$_3$)$_x$, wherein $0 \leq x \leq 2$.

3. The method for manufacturing the water-repellent film according to claim 1,
   wherein the adhesion precursor film forming step is performed by a cat-CVD process or a plasma CVD process.

4. The method for manufacturing the water-repellent film according to claim 1,
   wherein the excitation energy is ultraviolet or plasma.

5. The method for manufacturing the water-repellent film according to claim 1,
   wherein the organic film coating step is performed by vapor deposition.

6. The method for manufacturing the water-repellent film according to claim 1,
   wherein the silane coupling agent contains fluorine.

7. A substrate having been subjected to irregularity forming processing, comprising the water-repellent film manufactured by the method for manufacturing the water-repellent film according to claim 1.

8. A nozzle plate, comprising the water-repellent film manufactured by the method for manufacturing the water-repellent film according to claim 1.

9. An ink jet head, comprising the nozzle plate according to claim 8.

10. An ink jet recording device, comprising the ink jet head according to claim 9.

* * * * *